(12) United States Patent
Minato et al.

(10) Patent No.: US 12,360,088 B2
(45) Date of Patent: Jul. 15, 2025

(54) LIQUID CHROMATOGRAPH

(71) Applicant: SHIMADZU CORPORATION, Kyoto (JP)

(72) Inventors: Hiroyuki Minato, Kyoto (JP); Shotaro Ando, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 247 days.

(21) Appl. No.: 17/798,504

(22) PCT Filed: Feb. 21, 2020

(86) PCT No.: PCT/JP2020/007254
§ 371 (c)(1),
(2) Date: Aug. 9, 2022

(87) PCT Pub. No.: WO2021/166265
PCT Pub. Date: Aug. 26, 2021

(65) Prior Publication Data
US 2023/0104759 A1 Apr. 6, 2023

(51) Int. Cl.
*G01N 30/38* (2006.01)
*G01N 30/02* (2006.01)
(Continued)

(52) U.S. Cl.
CPC .............. *G01N 30/38* (2013.01); *G01N 30/20* (2013.01); *G01N 30/46* (2013.01); *G01N 30/466* (2013.01);
(Continued)

(58) Field of Classification Search
CPC ...... G01N 30/38; G01N 30/466; G01N 30/20; G01N 30/60; G01N 30/46; G01N 2030/027; G01N 2030/385; G01N 37/00
See application file for complete search history.

(56) References Cited

U.S. PATENT DOCUMENTS 3,550,429 A * 12/1970 MacMurtrie ......... G01N 30/466
73/23.39
5,958,227 A * 9/1999 Uematsu ............... G01N 30/468
210/659

(Continued)

FOREIGN PATENT DOCUMENTS

JP 62063857 A * 3/1987
JP 01-235849 * 9/1989
(Continued)

OTHER PUBLICATIONS

Translation of JP01-235849.*
(Continued)

*Primary Examiner* — Helen C Kwok
(74) *Attorney, Agent, or Firm* — Renner, Otto, Boisselle & Sklar, LLP

(57) ABSTRACT

A liquid chromatograph includes a sample supplier that supplies a sample into a mobile phase, a chip column having a flow path that functions as a separation column on a substrate, a packed column, a switcher configured to be switchable between a first state in which a mobile phase and a sample are guided from the sample supplier to the chip column and a second state in which a mobile phase and a sample are guided from the sample supplier to the packed column, and a detector that detects a sample that has passed through the chip column and a sample that has passed through the packed column.

2 Claims, 7 Drawing Sheets

(51) Int. Cl.
  *G01N 30/20* (2006.01)
  *G01N 30/46* (2006.01)
  *G01N 30/60* (2006.01)
  *G01N 37/00* (2006.01)

(52) U.S. Cl.
  CPC ............ *G01N 30/60* (2013.01); *G01N 37/00* (2013.01); *G01N 2030/027* (2013.01); *G01N 2030/385* (2013.01)

(56) References Cited

U.S. PATENT DOCUMENTS

| | | | | |
|---|---|---|---|---|
| 6,136,272 | A * | 10/2000 | Weigl | B01F 25/314 436/178 |
| 6,318,157 | B1 * | 11/2001 | Corso | G01N 30/466 210/659 |
| 6,641,783 | B1 * | 11/2003 | Pidgeon | G01N 30/7266 210/659 |
| 7,937,990 | B2 * | 5/2011 | Nagaoka | G01N 30/6047 73/61.53 |
| 11,307,181 | B1 * | 4/2022 | Zelechonok | G01N 30/22 |
| 2002/0127739 | A1 * | 9/2002 | Pieper | G01N 33/6803 436/515 |
| 2004/0026617 | A1 * | 2/2004 | Gregori | G01N 30/84 250/288 |
| 2004/0173509 | A1 * | 9/2004 | Ito | G01N 30/463 210/94 |
| 2004/0178133 | A1 * | 9/2004 | Deguchi | G01N 30/20 210/85 |
| 2005/0269264 | A1 * | 12/2005 | Fermier | B01D 15/163 210/136 |
| 2005/0274174 | A1 | 12/2005 | Tai et al. | |
| 2007/0037242 | A1 * | 2/2007 | Ji | C12P 21/06 435/68.1 |
| 2007/0295664 | A1 * | 12/2007 | Glatz | G01N 30/462 210/656 |
| 2008/0038152 | A1 * | 2/2008 | Van Pelt | G01N 30/7266 285/356 |
| 2008/0064110 | A1 * | 3/2008 | Elizarov | C07B 59/00 436/43 |
| 2009/0151808 | A1 * | 6/2009 | Van Pelt | G01N 30/56 141/31 |
| 2010/0058841 | A1 * | 3/2010 | Wilen | F16K 11/0743 137/625.46 |
| 2011/0114549 | A1 * | 5/2011 | Yin | G01N 30/6095 210/198.2 |
| 2012/0024399 | A1 | 2/2012 | Prentice et al. | |
| 2012/0037724 | A1 | 2/2012 | Prentice et al. | |
| 2013/0313197 | A1 * | 11/2013 | Ritchie | G01N 30/6004 210/656 |
| 2014/0319042 | A1 | 10/2014 | Prentice et al. | |
| 2015/0290644 | A1 | 10/2015 | Prentice et al. | |
| 2016/0018365 | A1 * | 1/2016 | Agah | B01J 20/281 427/255.31 |
| 2018/0348175 | A1 * | 12/2018 | Auner | G01N 30/6091 |
| 2019/0383777 | A1 * | 12/2019 | Inoue | G01N 30/32 |
| 2021/0131918 | A1 * | 5/2021 | Wiederin | H01J 49/40 |
| 2021/0223215 | A1 * | 7/2021 | Ohashi | G01N 30/26 |
| 2022/0107293 | A1 * | 4/2022 | Nogami | G01N 30/86 |
| 2022/0155265 | A1 * | 5/2022 | Sakamoto | B01D 15/426 |

FOREIGN PATENT DOCUMENTS

| | | |
|---|---|---|
| JP | 2007-523351 A | 8/2007 |
| JP | 2015-172586 A | 10/2015 |
| JP | 2017-116350 A | 6/2017 |

OTHER PUBLICATIONS

International Search Report for corresponding Application No. PCT/JP2020/007254, mailed Apr. 14, 2020.

Written Opinion for corresponding Application No. PCT/JP2020/007254, mailed Apr. 14, 2020 (English translation).

Office Action in corresponding Chinese Patent Application No. 202080096485.2 dated Jul. 20, 2023, with English machine translation.

Office Action in corresponding Chinese Patent Application No. 202080096485.2 dated Apr. 16, 2024, with English machine translation.

Decision on Rejection in corresponding Chinese Patent Application No. 202080096485.2 dated Jun. 24, 2024, with English machine translation.

* cited by examiner

F I G. 5
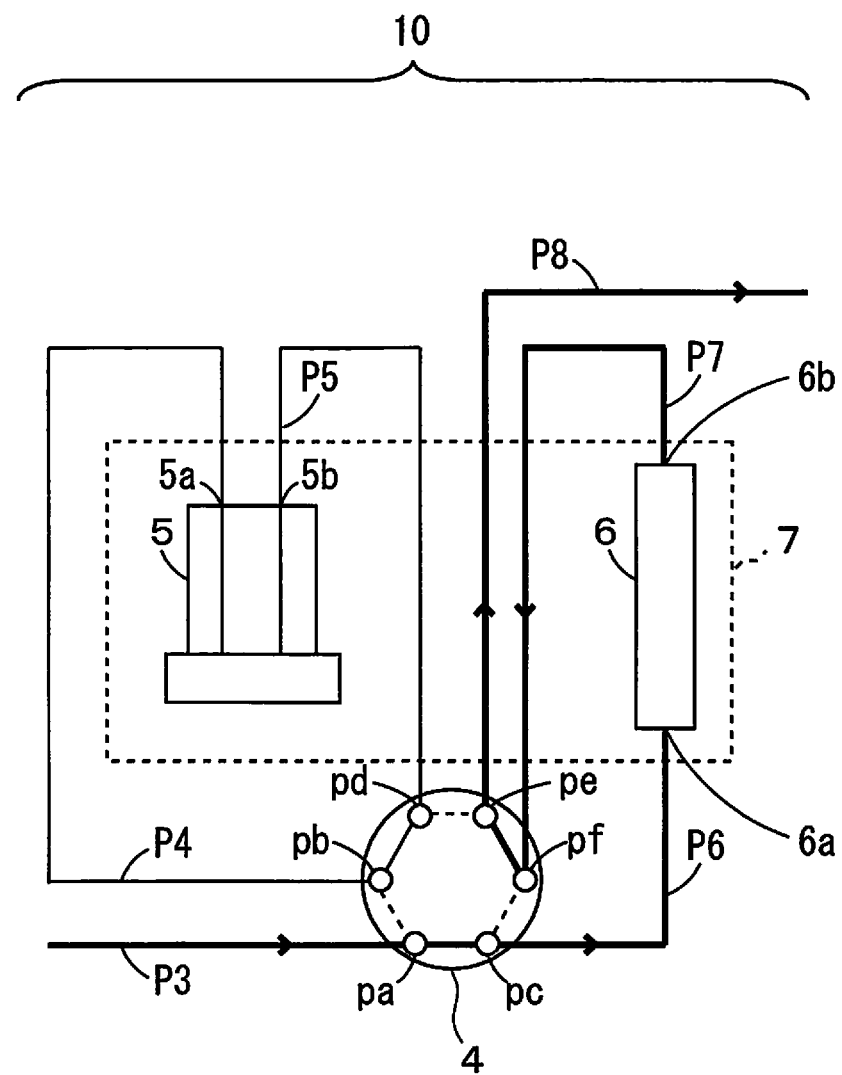

LIQUID CHROMATOGRAPH

TECHNICAL FIELD

The present invention relates to a liquid chromatograph.

BACKGROUND ART

A liquid chromatograph includes a separation column that separates a sample into components. As the separation column, a packed column is used, for example. The packed column has a structure in which a pipe is filled with a filler (stationary phase).

On the other hand, Patent Document 1 describes an on-chip temperature controlled liquid chromatography separation column. The separation column of Patent Document 1 is formed on a substrate integrated with a heater. Patent Document 2 describes a microfluidic substrate. In the microfluidic substrate of Patent Document 2, a channel functioning as a separation column is formed in a layer of a substrate.

[Patent Document 1] JP 2007-523351 A
[Patent Document 2] JP 2015-172586 A

SUMMARY OF INVENTION

Technical Problem

In the present specification, a separation column having a structure in which a flow path is formed on a substrate is referred to as a chip column. The chip column is excellent in workability such as replacement and maintenance. However, a packed column may be more suitable than the chip column depending on the type of a sample, the type of a mobile phase or the like. In this case, a worker needs to replace the chip column attached to a liquid chromatograph with the packed column. Since a packed column has a size and a structure different from those of a chip column, the worker has to change a pipe, connect a pipe, etc. using a tool. Therefore, complicated work is required to attach and detach the packed column.

An object of the present invention to provide a liquid chromatograph in which an appropriate separation column can be easily used.

Solution to Problem

A liquid chromatograph according to one aspect of the present invention includes a sample supplier that supplies a sample into a mobile phase, a chip column having a flow path that functions as a separation column on a substrate, a packed column, a switcher configured to be switchable between a first state in which a mobile phase and a sample are guided from the sample supplier to the chip column and a second state in which a mobile phase and a sample are guided from the sample supplier to the packed column, and a detector that detects a sample that has passed through the chip column and a sample that has passed through the packed column.

Advantageous Effects of Invention

The present invention enables provision of a liquid chromatograph in which an appropriate separation column can be easily used.

BRIEF DESCRIPTION OF THE DRAWINGS

FIG. 5 is a schematic diagram showing the configuration and operation of the separation column unit in the liquid chromatograph according to the second embodiment.

DESCRIPTION OF EMBODIMENTS

A liquid chromatograph according to embodiments of the present invention will be described below in detail with reference to the drawings.

(1) First Embodiment

Figure 1:
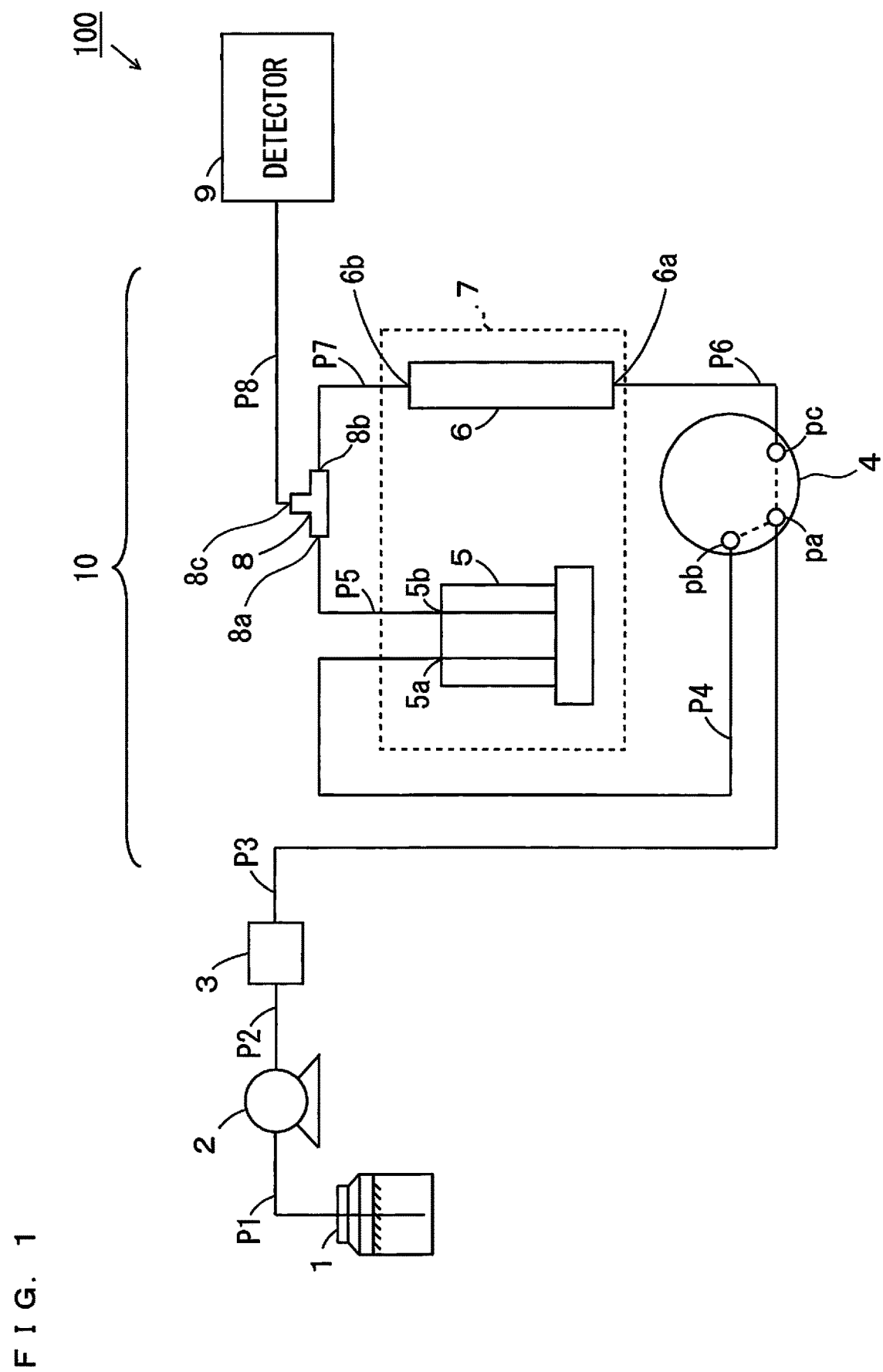
FIG. 1 is a schematic diagram showing the configuration of a liquid chromatograph according to a first embodiment.

FIG. 1 is a schematic diagram showing the configuration of a liquid chromatograph according to a first embodiment. The liquid chromatograph 100 of FIG. 1 includes a pump 2, a sample introducer 3, a flow-path switching valve 4, a chip column 5, a packed column 6, a column oven 7, a three-way joint 8, a detector 9 and flow paths P1 to P8.

The flow-path switching valve 4 includes ports pa, pb, pc. The chip column 5 has a structure in which a flow path that functions as a separation column is formed on a substrate. A substrate is a semiconductor chip or a ceramic chip, for example. Further, the chip column 5 also has a fluid inlet port 5a and a fluid outlet port 5b. The packed column 6 has a fluid inlet port 6a and a fluid outlet port 6b. The chip column 5 and the packed column 6 are housed in a column oven 7. The three-way joint 8 has ports 8a, 8b, 8c. The flow-path switching valve 4, the chip column 5, the packed column 6, the three-way joint 8 and the flow paths P3 to P8 constitute a separation column unit 10.

The pump 2 sucks a mobile phase from a mobile phase container 1 through the flow path P1 and guides the mobile phase to the sample introducer 3 through the flow path P2. The sample introducer 3 introduces a sample to be analyzed into the mobile phase. The mobile phase and the sample are supplied to the separation column unit 10 from the sample introducer 3 through the flow path P3. The sample introducer 3 is an autosampler, for example.

The sample introducer 3 and the port pa of the flow-path switching valve 4 are connected to each other by the flow path P3. The port pb of the flow-path switching valve 4 and the fluid inlet port 5a of the chip column 5 are connected to each other by the flow path P4. The fluid outlet port 5b of the chip column 5 and the port 8a of the three-way joint 8 are connected to each other by the flow path P5.

Further, the port pc of the flow-path switching valve 4 and the fluid inlet port 6a of the packed column 6 are connected to each other by the flow path P6. The fluid outlet port 6b of the packed column 6 and the port 8b of the three-way joint 8 are connected to each other by the flow path P7. The port 8c of the three-way joint 8 and the detector 9 are connected to each other by the flow path P8.

The flow-path switching valve 4 is configured to be switchable between a first state and a second state. In the first state, the port pa and the port pb are connected to each other, and the port pa and the port pc are disconnected from each other. In the second state, the port pa and the port pc are connected to each other, and the port pa and the port pb are disconnected from each other. The flow-path switching valve 4 may be switched between the first state and the second state manually by a user or automatically by a controller such as a computer.

Figure 2:
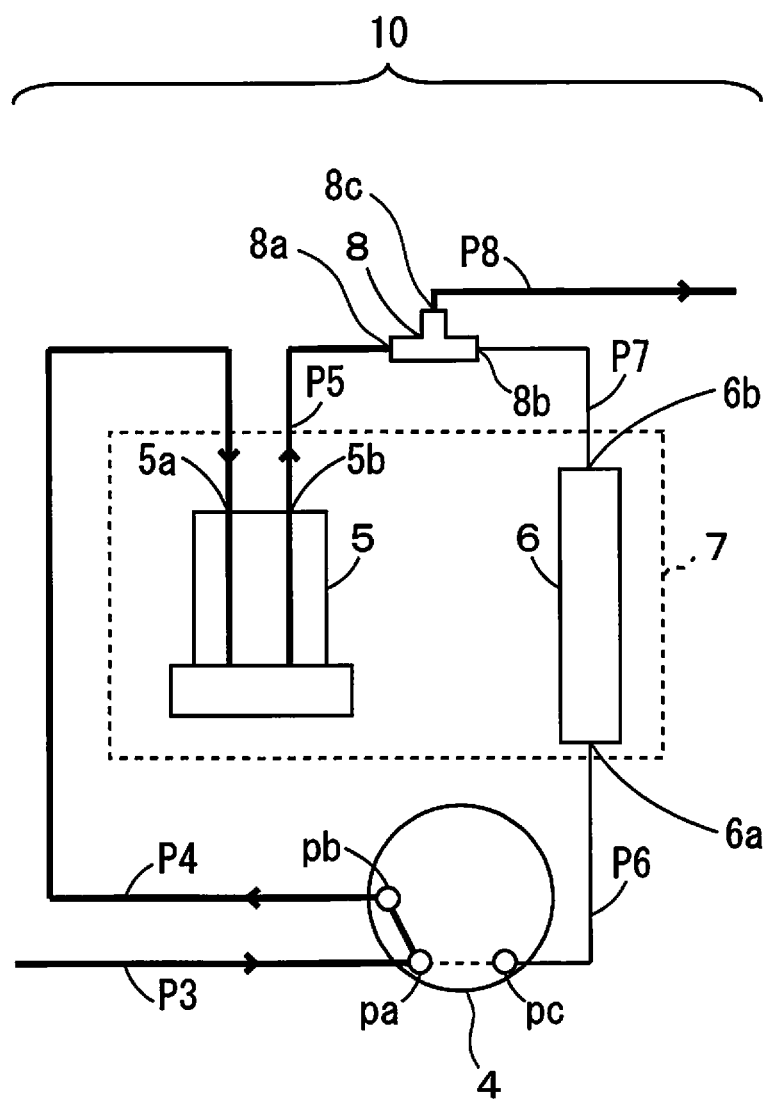
FIG. 2 is a diagram for explaining the operation of a separation column unit of FIG. 1.
Figure 3:
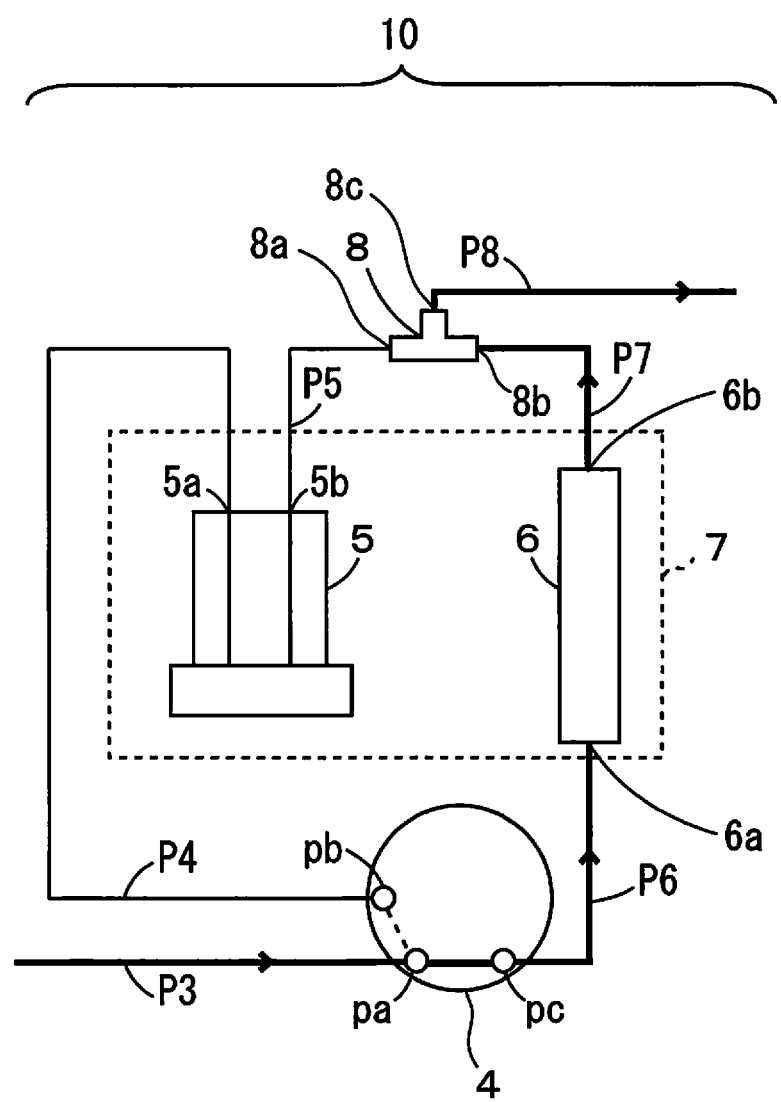
FIG. 3 is a diagram for explaining the operation of the separation column unit of FIG. 1.

FIGS. 2 and 3 are diagrams for explaining the operation of the separation column unit 10 of FIG. 1. FIG. 2 shows the operation of the chip column 5 in use in the separation column unit 10. FIG. 3 shows the operation of the packed column 6 in use in the separation column unit 10. In FIGS. 2 and 3, a flow of fluid is indicated by the thick arrows.

As shown in FIG. 2, when the chip column 5 is in use, the flow-path switching valve 4 is switched to the first state. Thus, the port pa and the port pb of the flow-path switching valve 4 are connected to each other. In this case, a mobile phase and a sample guided from the sample introducer 3 of FIG. 1 to the flow path P3 are introduced into the fluid inlet port 5a of the chip column 5 through the ports pa, pb of the flow-path switching valve 4 and the flow path P4. The mobile phase and the sample that have been introduced into the chip column 5 are separated into components and led out from the fluid outlet port 5b.

The mobile and the sample that have been led out from the fluid outlet port 5b are introduced into the port 8a of the three-way joint 8 through the flow path P5 and guided from the port 8c of the three-way joint 8 to the detector 9 of FIG. 1 through the flow path P8. In this case, because the port pa and the port pc of the flow-path switching valve 4 are disconnected from each other, the mobile phase and the sample are not supplied to the packed column 6.

As shown in FIG. 3, when the packed column 6 is in use, the flow-path switching valve 4 is switched to the second state. Thus, the port pa and the port pc of the flow-path switching valve 4 are connected to each other. In this case, the mobile phase and the sample that have been guided from the sample introducer 3 of FIG. 1 to the flow path P3 are introduced into the fluid inlet port 6a of the packed column 6 through the ports pa, pc of the flow-path switching valve 4 and the flow path P6. The mobile phase and the sample that have been introduced into the packed column 6 are separated into components and led out from the fluid outlet port 6b.

The mobile phase and the sample that have been led out from the fluid outlet port 6b are introduced into the port 8b of the three-way joint 8 through the flow path P7 and guided from the port 8c of the three-way joint 8 to the detector 9 of FIG. 1 through the flow path P8. In this case, because the port pa and the port pb of the flow-path switching valve 4 are disconnected from each other, the mobile phase and the sample are not supplied to the chip column 5.

In this manner, with the liquid chromatograph 100 according to the first embodiment, it is possible to use the chip column 5 by switching the flow-path switching valve 4 to the first state. Further, it is possible to use the packed column 6 by switching the flow-path switching valve 4 to the second state. Therefore, it is not necessary to perform complicated work such as replacement of a pipe and connection of a pipe in order to switch a separation column to use between the chip column 5 and the packed column 6. Therefore, an appropriate separation column can be easily used in accordance with the type of a sample or a mobile phase.

Further, it is possible to analyze one sample using the chip column 5 and the packed column 6 by switching the flow-path switching valve 4 between the first state and the second state during an analysis of the one sample.

Further, the flow path from the fluid outlet port 5b of the chip column 5 of FIG. 2 to the detector 9 does not go through the flow-path switching valve 4. Therefore, the flow path from the fluid outlet port 5b to the detector 9 is shortened. Further, the flow path from the fluid outlet port 6b of the packed column 6 of FIG. 3 to the detector 9 does not go through the flow-path switching valve 4. Therefore, the flow path from the fluid outlet port 6b to the detector 9 is shortened. As a result, diffusion of a sample that have been separated into components by the chip column 5 and the packed column 6 is prevented. Therefore, an increase in peak width corresponding to each component in a chromatogram is suppressed.

(2) Second Embodiment

Figure 4:
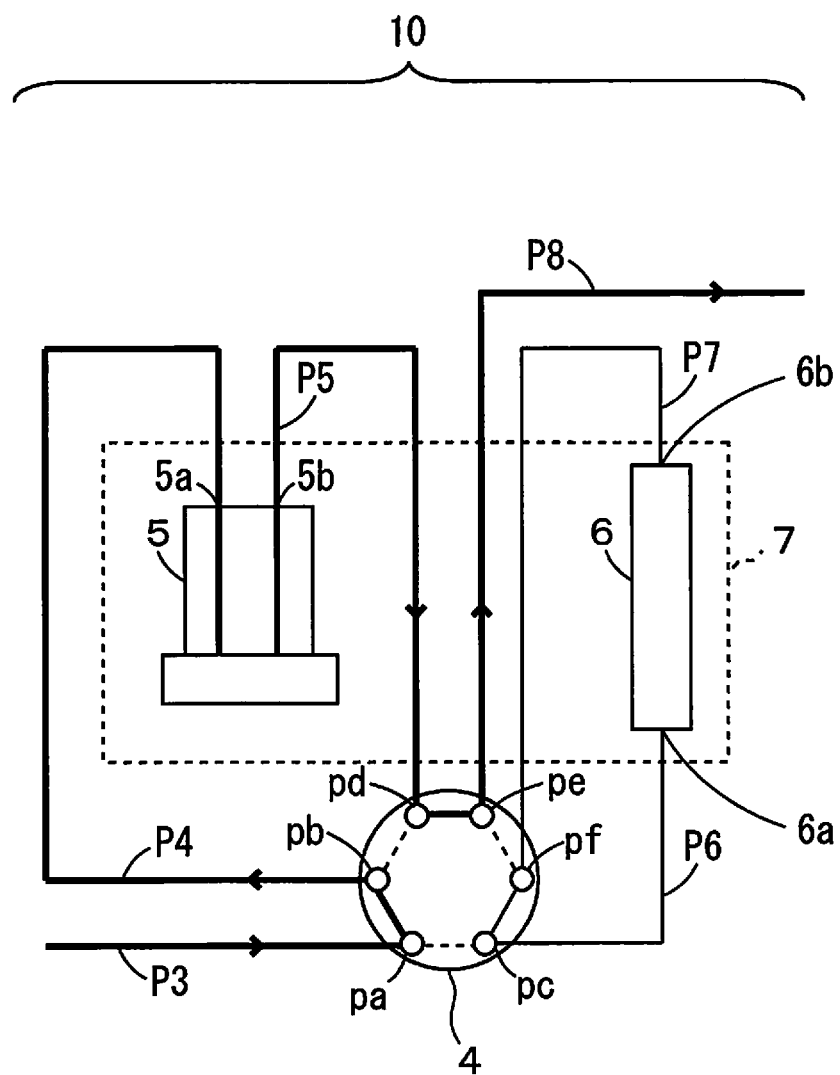
FIG. 4 is a schematic diagram showing the configuration and operation of a separation column unit in a liquid chromatograph according to a second embodiment.

FIGS. 4 and 5 are schematic views showing the configuration and operation of a separation column unit 10 in a liquid chromatograph according to a second embodiment. In the liquid chromatograph according to the second embodiment, the configuration of portions other than the separation column unit 10 is similar to that of the liquid chromatograph 100 of FIG. 1. FIG. 4 shows the operation of a chip column 5 in use in the separation column unit 10. FIG. 5 shows the operation of a packed column 6 in use in the separation column unit 10. In FIGS. 4 and 5, a flow of fluid is indicated by the thick arrows.

The separation column unit 10 of FIGS. 4 and 5 differs from the separation column unit 10 of FIGS. 2 and 3 in the following points. A flow-path switching valve 4 includes ports pa, pb, pc, pd, pe, pf. The separation column unit 10 does not include a three-way joint 8.

The flow-path switching valve 4 is configured to be switchable between a first state and a second state. In the first state, the port pa and the port pb are connected to each other, the port pd and the port pe are connected to each other, the port pc and the port pf are connected to each other, the port pa and the port pc are disconnected from each other, the port pe and the port pf are disconnected from each other and the port pb and the port pd are disconnected from each other. In the second state, the port pa and the port pc are connected to each other, the port pe and the port pf are connected to each other, the port pb and the port pd are connected to each other, the port pa and the port pb are disconnected from each other, the port pd and the port pe are disconnected from each other, and the port pc and the port pf are disconnected from each other.

A fluid outlet port 5b of the chip column 5 and the port pd of the flow-path switching valve 4 are connected to each other by a flow path P5. The port pe of the flow-path switching valve 4 and the detector 9 of FIG. 1 are connected to each other by a flow path P8. The port pc of the flow-path switching valve 4 and a fluid inlet port 6a of the packed column 6 are connected to each other by a flow path P6. A fluid outlet port 6b of the packed column 6 and the port pf of the flow-path switching valve 4 are connected to each other by a flow path P7.

As shown in FIG. 4, when the chip column 5 is in use, the flow-path switching valve 4 is switched to the first state. Thus, in the flow-path switching valve 4, the port pa and the port pb are connected to each other, the port pd and the port pe are connected to each other and the port pc and the port pf are connected to each other. In this case, a mobile phase and a sample that have been guided from the sample introducer 3 of FIG. 1 to a flow path P3 are introduced into a fluid inlet port 5a of the chip column 5 through the ports pa, pb of the flow-path switching valve 4 and a flow path P4.

The mobile phase and the sample that have been introduced into the chip column 5 are separated into components and led out from the fluid outlet port 5*b*.

The mobile phase and the sample that have been led out from the fluid outlet port 5*b* are guided to the detector 9 of FIG. 1 through the flow path P5, the ports pd, pe of the flow-path switching valve 4 and the flow path P8. In this case, in the flow-path switching valve 4, the port pa and the port pc are disconnected from each other, and the port pe and the port pf are disconnected from each other. Thus, the mobile phase and the sample are not supplied to the packed column 6.

As shown in FIG. 5, when the packed column 6 is in use, the flow-path switching valve 4 is switched to the second state. Thus, in the flow-path switching valve 4, the port pa and the port pc are connected to each other, the port pe and the port pf are connected to each other, and the port pb and the port pd are connected to each other. In this case, a mobile phase and a sample that have been guided from the sample introducer 3 of FIG. 1 to the flow path P3 are introduced into the fluid inlet port 6*a* of the packed column 6 through the ports pa, pc of the flow-path switching valve 4 and the flow path P6. The mobile phase and the sample that have been introduced into the packed column 6 are separated into components and led out from the fluid outlet port 6*b*.

The mobile phase and the sample that have been led out from the fluid outlet port 6*b* are guided to the detector 9 of FIG. 1 through the flow path P7, the ports pe, pf of the flow-path switching valve 4 and the flow path P8. In this case, in the flow-path switching valve 4, the port pa and the port pb are disconnected from each other, and the port pd and the port pe are disconnected from each other. Thus, the mobile phase and the sample are not supplied to the chip column 5.

In this manner, with the liquid chromatograph 100 according to the second embodiment, it is possible to use the chip column 5 by switching the flow-path switching valve 4 to the first state. Further, it is possible to use the packed column 6 by switching the flow-path switching valve 4 to the second state. Therefore, it is not necessary to perform complicated work such as replacement of a pipe and connection of a pipe in order to switch a separation column to use between the chip column 5 and the packed column 6. Therefore, an appropriate separation column can be easily used in accordance with the type of a sample or a mobile phase.

Further, when the chip column 5 is in use, the flow path constituted by the packed column 6 and the flow paths P6, P7 is completely separated from the flow paths P3, P4, P5, P8 through which a mobile phase and a sample flow. In this case, even in a case in which the packed column 6 is detached from the flow paths P6, P7, the mobile phase and the sample do not leak. Further, when the packed column 6 is in use, the flow path constituted by the chip column 5 and the flow paths P4, P5 is completely separated from the flow paths P3, P6, P7, P8 through which a mobile phase and a sample flow. In this case, even in a case in which the chip column 5 is detached from the flow paths P4, P5, the mobile phase and the sample do not leak.

Further, it is possible to analyze one sample using the chip column 5 and the packed column 6 by switching the flow-path switching valve 4 between the first state and the second state during an analysis of the one sample.

Therefore, even in a case in which one of the chip column 5 and the packed column 6 is not attached to the separation column unit 10, a worker can perform an analysis of a sample using the other one of the chip column 5 and the packed column 6. Thus, even in a case in which one of the chip column 5 and the packed column 6 of the separation column unit 10 is being maintained, the worker can perform an analysis of a sample using the other of the chip column 5 and the packed column 6.

(3) Third Embodiment

Figure 6:
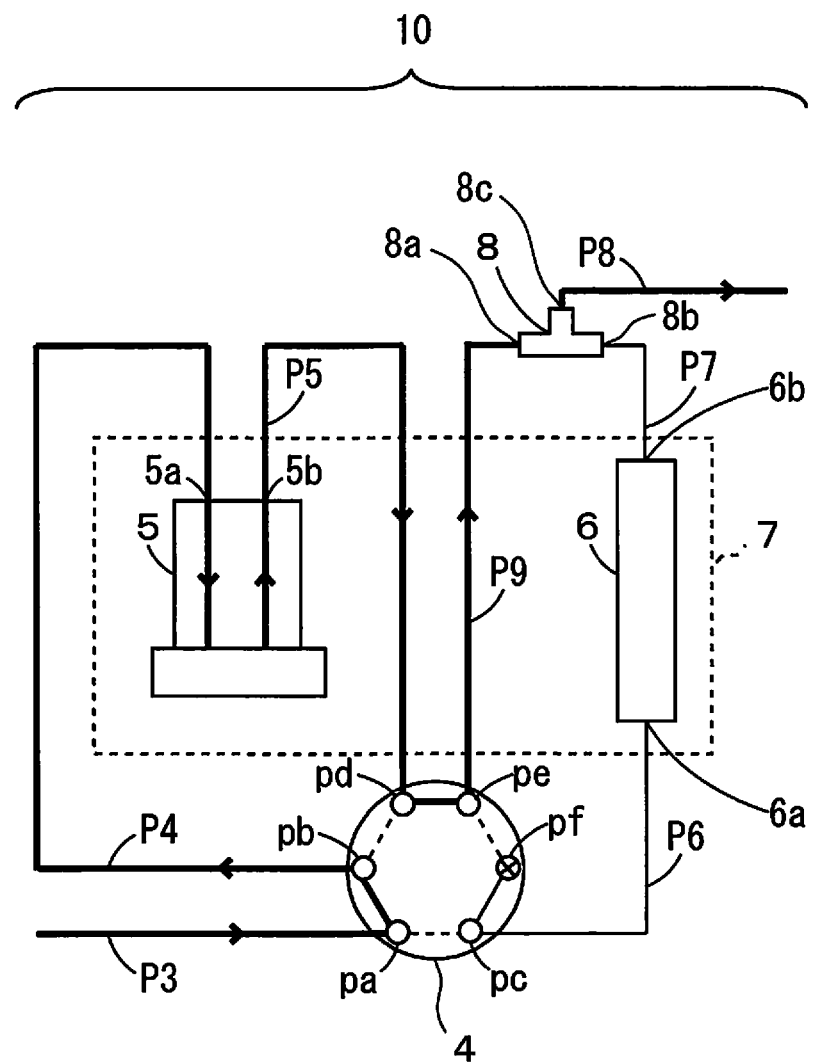
FIG. 6 is a schematic diagram showing the configuration and operation of a separation column unit in a liquid chromatograph according to a third embodiment.
Figure 7:
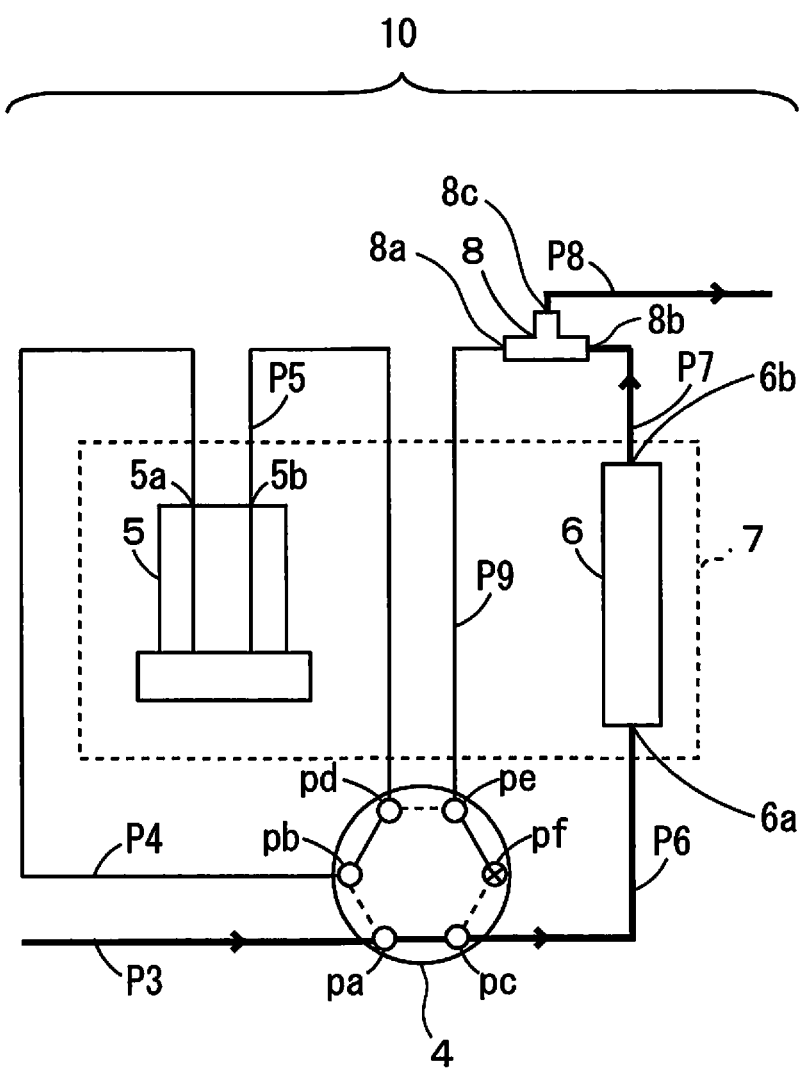
FIG. 7 is a schematic diagram showing the configuration and operation of the separation column unit in the liquid chromatograph according to the third embodiment.

FIGS. 6 and 7 are schematic views showing the configuration and operation of a separation column unit 10 in a liquid chromatograph according to a third embodiment. In the liquid chromatograph according to the third embodiment, the configuration of portions other than the separation column unit 10 is similar to that of the liquid chromatograph 100 of FIG. 1. FIG. 6 shows the operation of a chip column 5 in use in the separation column unit 10. FIG. 7 shows the operation of a packed column 6 in use in the separation column unit 10. In FIGS. 6 and 7, a flow of fluid is indicated by the thick arrows.

The separation column unit 10 of FIGS. 6 and 7 differs from the separation column unit 10 of FIGS. 4 and 5 in the following points. A port pf of a flow-path switching valve 4 is closed. The separation column unit 10 further includes a flow path P9 and a three-way joint 8.

The flow-path switching valve 4 is configured to be switchable between a first state and a second state. In the first state, a port pa and a port pb are connected to each other, a port pd and a port pe are connected to each other, a port pc and a port pf are connected to each other, the port pa and the port pc are disconnected from each other, the port pe and the port pf are disconnected from each other and the port pb and the port pd are disconnected from each other. In the second state, the port pa and the port pc are connected to each other, the port pe and the port pf are connected to each other, the port pb and the port pd are connected to each other, the port pa and the port pb are disconnected from each other, the port pd and the port pe are disconnected from each other, and the port pc and the port pf are disconnected from each other.

The port pe of the flow-path switching valve 4 and the port 8*a* of the three-way joint 8 are connected to each other by a flow path P9. A fluid outlet port 6*b* of the packed column 6 and a port 8*b* of the three-way joint 8 are connected to each other by a flow path P7. A port 8*c* of the three-way joint 8 and the detector 9 of FIG. 1 are connected to each other by a flow path P8.

As shown in FIG. 6, when the chip column 5 is in use, the flow-path switching valve 4 is switched to the first state. Thus, in the flow-path switching valve 4, the port pa and the port pb are connected to each other, the port pd and the port pe are connected to each other and the port pc and the port pf are connected to each other. In this case, a mobile phase and a sample that have been guided from the sample introducer 3 of FIG. 1 to a flow path P3 are introduced into a fluid inlet port 5*a* of the chip column 5 through the ports pa, pb of the flow-path switching valve 4 and a flow path P4. The mobile phase and the sample that have been introduced into the chip column 5 are separated into components and led out from a fluid outlet port 5*b*.

The mobile and the sample that have been led out from the fluid outlet port 5*b* are introduced into the port 8*a* of the three-way joint 8 through the flow path P5, the ports pd, pe of the flow-path switching valve 4 and the flow path P9 and guided from the port 8*c* of the three-way joint 8 to the detector 9 of FIG. 1 through the flow path P8. In this case, in the flow-path switching valve 4, the port pa and the port pc are disconnected from each other, and the port pe and the port pf are disconnected from each other. Thus, the mobile phase and the sample are not supplied to the packed column 6.

As shown in FIG. 7, when the packed column 6 is in use, the flow-path switching valve 4 is switched to the second state. Thus, in the flow-path switching valve 4, the port pa and the port pc are connected to each other, the port pe and the port pf are connected to each other and the port pb and the port pd are connected to each other. In this case, a mobile phase and a sample that have been guided from the sample introducer 3 of FIG. 1 are introduced into a fluid inlet port 6a of the packed column 6 through the ports pa, pc of the flow-path switching valve 4 and the flow path P6. The mobile phase and the sample that have been introduced into the packed column 6 are separated into components and led out from the fluid outlet port 6b.

The mobile phase and the sample that have been led out from the fluid outlet port 6b are introduced into the port 8b of the three-way joint 8 through the flow path P7 and guided from the port 8c of the three-way joint 8 to the detector 9 of FIG. 1 through the flow path P8. In this case, in the flow-path switching valve 4, the port pa and the port pb are disconnected from each other, and the port pd and the port pe are disconnected from each other. Thus, the mobile phase and the sample are not supplied to the chip column 5.

In this manner, with the liquid chromatograph 100 according to the third embodiment, it is possible to use the chip column 5 by switching the flow-path switching valve 4 to the first state. Further, it is possible to use the packed column 6 by switching the flow-path switching valve 4 to the second state. Therefore, it is not necessary to perform complicated work such as replacement of a pipe and connection of a pipe in order to switch a separation column to use between the chip column 5 and the packed column 6. Therefore, an appropriate separation column can be easily used in accordance with the type of a sample or a mobile phase.

Further, when the packed column 6 is in use, the flow path constituted by the chip column 5 and the flow paths P4, P5 is completely separated from the flow paths P3, P6, P7, P8, P9 through which a mobile phase and a sample flow. In this case, even when the chip column 5 is detached from the flow paths P4, P5, the mobile phase and the sample do not leak through the three-way joint 8. Therefore, even in a case in which the chip column 5 is not attached to the separation column unit 10, a worker can perform an analysis of a sample using the packed column 6.

Further, the flow path from the fluid outlet port 6b of the packed column 6 of FIG. 7 to the detector 9 does not go through the flow-path switching valve 4. Therefore, the flow path from the fluid outlet port 6b to the detector 9 is shortened. As a result, diffusion of a sample separated into components by the packed column 6 is prevented. Therefore, an increase in peak width corresponding to each component in a chromatogram is suppressed.

Further, it is possible to analyze one sample using the chip column 5 and the packed column 6 by switching the flow-path switching valve 4 between the first state and the second state during an analysis of the one sample.

(4) Other Embodiments (a) While the three-way joint 8 is used in the separation column unit 10 in the liquid chromatograph 100 according to each of the first embodiment and the second embodiment, a three-way valve may be used instead of the three-way joint 8. In this case, it is possible to prevent a mobile phase and a sample from leaking to the packed column 6 when the chip column 5 is in use and prevent a mobile phase and a sample from leaking to the chip column 5 when the packed column 6 is in use, by switching the three-way valve.

(b) In the third embodiment (FIGS. 6 and 7), the port 8a of the three-way joint 8 is connected to the port pe of the flow-path switching valve 4, the port 8b of the three-way joint 8 is connected to the fluid outlet port 6b of the packed column 6, and the fluid outlet port 5b of the chip column 5 is connected to the port pd of the flow-path switching valve 4. However, the present invention is not limited to this. For example, the port 8a of the three-way joint 8 may be connected to the fluid outlet port 5b of the chip column 5, the port 8b of the three-way joint 8 may be connected to the port pd of the flow-path switching valve 4, and the fluid outlet port 6b of the packed column 6 may be connected to the port pe of the flow-path switching valve 4.

In this case, the flow path from the fluid outlet port 5b of the chip column 5 to the detector 9 does not go through the flow-path switching valve 4. Further, the flow path from the fluid outlet port 5b to the detector 9 is shortened. As a result, diffusion of a sample separated into components by the chip column 5 is prevented. Therefore, an increase in peak width corresponding to each component in a chromatogram is suppressed.

(5) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the sample introducer 3 is an example of a sample supplier, the flow-path switching valve 4 is an example of a switching valve, the three-way joint 8 is an example of a joint, the port 8a is an example of a first port, the port 8b is an example of a second port, the port 8c is an example of a third port, the flow-path switching valve 4, the flow paths P3, P4, P6 and the three-way joint 8 in the first embodiment, the flow-path switching valve 4 and the flow paths P3, P4, P6 in the second embodiment, the flow-path switching valve 4, the flow paths P3, P4, P6 and the three-way joint 8 in the third embodiment are examples of a switcher, the flow path P4 is an example of a first flow path, the flow path P6 is an example of a second flow path and the flow path P3 is an example of a third flow path.

(6) Aspects

It is understood by those skilled in the art that the plurality of above-mentioned illustrative embodiments are specific examples of the below-mentioned aspects.

(Item 1) A liquid chromatograph according to one aspect may include a sample supplier that supplies a sample into a mobile phase, a chip column having a flow path that functions as a separation column on a substrate, a packed column, a switcher configured to be switchable between a first state in which a mobile phase and a sample are guided from the sample supplier to the chip column and a second state in which a mobile phase and a sample are guided from the sample supplier to the packed column, and a detector that detects a sample that has passed through the chip column and a sample that has passed through the packed column.

With the liquid chromatograph according to item 1, when the switcher is switched to the first state, a mobile phase and a sample are guided from the sample supplier to the chip column, separated into components in the chip column and then guided to the detector. When the switcher is switched to the second state, a mobile phase and a sample are guided from the sample supplier to the packed column, are separated into components in the packed column and are then guided to the detector.

Thus, it is possible to selectively use the chip column and the packed column by switching the switcher between the first state and the second state. In this case, it is not necessary to perform complicated work such as replacement of a pipe and connection of a pipe in order to switch a separation column to use between the chip column and the packed column. Therefore, an appropriate separation column can be easily used in accordance with the type of a sample or the type of a mobile phase.

(Item 2) The liquid chromatograph according to item 1, wherein the switcher may include a first flow path connected to a fluid inlet port of the chip column, a second flow path connected to a fluid inlet port of the packed column, a third flow path connected to the sample supplier, and a switching valve configured to be switchable to connect the third flow path to the first flow path and disconnects the third flow path from the second flow path in the first state, and connect the third flow path to the second flow path and disconnect the third flow path from the first flow path in the second state.

With the liquid chromatograph according to item 2, when the switching valve is switched to the first state, a mobile phase and a sample are guided from the sample supplier to the chip column through the third flow path and the first flow path. When the switching valve is switched to the second state, a mobile phase and a sample are guided from the sample supplier to the packed column through the third flow path and the second flow path. Thus, a mobile phase and a sample can be selectively supplied to the chip column and the packed column with a simple configuration.

(Item 3) The liquid chromatograph according to item 2, wherein the switcher may further include a joint having first, second and third ports, the first port of the joint may be connected to a fluid outlet port of the chip column, the second port of the joint may be connected to a fluid outlet port of the packed column, and the third port of the joint may be connected to the detector.

With the liquid chromatograph according to item 3, when the switching valve is switched to the first state, a mobile phase and a sample that have been led out from the fluid outlet port of the chip column are guided to the detector through the first port and the third port of the junction. When the switching valve is switched to the second state, a mobile phase and a sample that have been led out from the fluid outlet port of the packed column are guided to the detector through the second port and the third port of the junction. Thus, a mobile phase and a sample that have been selectively led out from the chip column and the packed column can be supplied to the detector with a simple configuration.

(Item 4) The liquid chromatograph according to item 2, wherein the switching valve may be configured to be switchable to connect a fluid outlet port of the chip column to the detector and disconnect a fluid outlet port of the packed column from the detector in the first state, and connect a fluid outlet port of the packed column to the detector and disconnect a fluid outlet port of the chip column from the detector in the second state.

With the liquid chromatograph according to item 4, when the switching valve is switched to the first state, a mobile phase and a sample that have been led out from the fluid outlet port of the chip column are guided to the detector. In this case, the mobile phase and the sample are not guided to the packed column because the fluid outlet port of the packed column is disconnected from the detector. Thus, even when the packed column is detached, the mobile phase and the sample do not leak.

Further, when the switching valve is switched to the second state, the mobile phase and the sample that have been led out from the fluid outlet port of the packed column are guided to the detector. In this case, the mobile phase and the sample are not guided to the chip column because the fluid outlet port of the chip column is disconnected from the detector. Thus, even when the chip column is detached, the mobile phase and the sample do not leak.

This, during maintenance of one of the chip column and the packed column, an analysis of a sample can be performed with use of the other one of the chip column and the packed column.

(Item 5) The liquid chromatograph according to item 2, wherein the switcher may further include a joint having first, second and third ports, a fluid outlet port of the packed column may be connected to the second port of the joint, the third port of the joint may be connected to the detector, and the switching valve may be configured to be switchable to connect a fluid outlet port of the chip column to the first port of the joint in the first state, and disconnect a fluid outlet port of the chip column from the first port of the joint in the second state.

With the liquid chromatograph according to item 5, when the switching valve is switched to the first state, a mobile phase and a sample that have been led out from the fluid outlet port of the chip column are guided to the detector through the first port and the third port of the junction. Further, when the switching valve is switched to the second state, the mobile phase and the sample that have been led out from the fluid outlet port of the packed column are guided to the detector through the second port and the third port of the junction.

In this case, because the mobile phase and the sample that have been led out from the fluid outlet port of the packed column do not go through the switching valve, the flow path from the fluid outlet port of the packed column to the detector is shortened. Thus, since components into which a sample have been separated by the packed column are unlikely to diffuse, an increase in peak width corresponding to each component in a chromatogram is suppressed.

The invention claimed is:

1. A liquid chromatograph comprising:
   a sample supplier that supplies a sample into a mobile phase;
   a switcher including a chip input flow path, a packed input flow path, a chip output flow path, a packed output flow path, a switcher output flow path, a supplier flow path, and a switching valve, wherein:
      the supplier flow path is in fluid communication with the sample supplier, such that the supplied sample and the supplied mobile phase are received by the switcher from the sample supplier via the supplier flow path; and
      the switching valve is configured to switch between a first state and a second state;
   a chip column including a fluid inlet port and a fluid outlet port, wherein:
      the fluid inlet port is in fluid communication with the switcher via the chip input flow path;
      the fluid outlet port is in fluid communication with the switcher via the chip output flow path;
      the chip column includes a substrate and a flow path; and the flow path is located on the substrate and is configured to function as a separation column;
a packed column including a fluid inlet port and a fluid outlet port, wherein:
  the fluid inlet port is in fluid communication with the switcher via the packed input flow path; and
  the fluid outlet port is in fluid communication with the switcher via the packed output flow path; and
a detector in fluid communication with the switcher output flow path, wherein the detector is configured to detect the sample in the mobile phase received by the detector via the switcher output flow path;
wherein in the first state the switching valve connects the supplier flow path to the chip input flow path, connects the chip output flow path to the switcher output flow path, disconnects the supplier flow path from the packed input flow path, and disconnects the packed output flow path from the switcher output flow path, such that:
  the sample supplier is in fluid communication with the chip column via the switcher;
  the sample supplier is not in fluid communication with the packed column;
the chip column is in fluid communication with the detector via the switcher; and
  the packed column is not in fluid communication with the detector; and
wherein in the second state the switching valve connects the supplier flow path to the packed input flow path, connects the packed output flow path to the switcher output flow path, disconnects the supplier flow path from the chip input flow path, and disconnects the chip output flow path from the switcher output flow path such that:
  the sample supplier is in fluid communication with the packed column via the switcher;
  the sample supplier is not in fluid communication with the chip column;
  the packed column is in fluid communication with the detector via the switcher; and
  the chip column is not in fluid communication with the detector;
wherein the switching valve includes a first port(pa), a second port(pb), a third port(pc), a fourth port(pd), a fifth port(pe), and a sixth port(pf),
wherein the first port(pa) is in fluid communication with the supplier flow path(p3),
wherein second port(pb) is in fluid communication with the chip input flow path(p4),
wherein the third port(pc) is in fluid communication with the chip output flow path (p6),
wherein the fourth port(pd) is in fluid communication with the chip output flow path (p5),
wherein the fifth port(pe) is in fluid communication with the switcher output flow bath (p8),
wherein the sixth port(pf) is in fluid communication with the packed output flow path (p7);
wherein, in the first state, the first port(pa) is in fluid communication with the second port(pb), the third port(pc) is in fluid communication with the sixth port (pf), and the fourth port(pd) is in fluid communication with the fifth port(pe); and
wherein, in the second state, the first port(pa) is in fluid communication with the third port(pc), the second port(pb) is in fluid communication with the fourth port(pd), and the fifth port(pe) is in fluid communication sixth port(pf).

2. A liquid chromatograph comprising:
a sample supplier that supplies a sample into a mobile phase;
a switcher including a chip input flow path, a packed input flow path, a chip output flow path, a packed output flow path, a switcher output flow path, a supplier flow path, a switching valve and a joint, wherein:
  the supplier flow path is in fluid communication with the sample supplier, such that the supplied sample and the supplied mobile phase are received by the switcher from the sample supplier via the supplier flow path; and
  the switching valve is configured to switch between a first state and a second state;
a chip column including a fluid inlet port and a fluid outlet port, wherein:
  the fluid inlet port is in fluid communication with the switching valve via the chip input flow path;
  the fluid outlet port is in fluid communication with the switching valve via the chip output flow path;
  the chip column includes a substrate and a flow path; and
  the flow path is located on the substrate and is configured to function as a separation column;
a packed column including a fluid inlet port and a fluid outlet port, wherein:
  the fluid inlet port is in fluid communication with the switching valve via the packed input flow path; and
  the fluid outlet port is in fluid communication with the joint via the packed output flow path;
the joint includes a first input port, a second input port, and an output port, wherein the output port is in fluid communication with the first input port and the second input port, such that fluid received by the first input port and the second input port are output via the output port of the joint; and
a detector in fluid communication with the switcher output flow path, wherein the detector is configured to detect the sample in the mobile phase received by the detector via the switcher output flow path;
wherein in the first state the switching valve connects the supplier flow path to the chip input flow path, connects the chip output flow path to the switcher output flow path via the joint, disconnects the supplier flow path from the packed input flow path, such that:
  the sample supplier is in fluid communication with the chip column via the switching valve;
  the sample supplier is not in fluid communication with the packed column; and
  the chip column is in fluid communication with the detector via the switching valve and the joint;
wherein in the second state the switching valve connects the supplier flow path to the packed input flow path, disconnects the supplier flow path from the chip input flow path, and disconnects the chip output flow path from the switcher output flow path such that:
  the sample supplier is in fluid communication with the packed column via the switching valve;
  the sample supplier is not in fluid communication with the chip column;
  the packed column is in fluid communication with the detector via the joint; and
  the chip column is not in fluid communication with the detector,
wherein the switching valve includes a first port(pa), a second port(pb), a third port(pc), a fourth port(pd), a fifth port(pe) and a sixed port(pf), wherein the first port(pa) is in fluid communication with the supplier flow path (p3), wherein the second port(pb) is in fluid communication with the chip input flow path(p4), wherein the third port(pc) is in fluid communication with the packed input flow path (p6), wherein the fourth port(pd) is in fluid communication with the chip output flow path (p5), wherein the fifth port(pe) is in fluid communication with the first input port of the joint, wherein the sixed port(pf) is closed, wherein the output port of the joint is in fluid communication with the switcher output flow path (p8), wherein the second input port of the joint is in fluid communication with the packed output flow path(p7), wherein, in the first state, the first port(pa) is in fluid communication with the second port(pb), the third port(pc) is in fluid communication with the sixth port (pf), and the fourth port(pd) is in fluid communication with the fifth port(pe), and wherein, in the second state, the first port(pa) is in fluid communication with the third port(pc), the second port(pb) is in fluid communication with the fourth port(pd), and the fifth port(pe) is in fluid communication with the sixth port(pf).

* * * * *